United States Patent [19]
Cruickshank

[11] Patent Number: 6,166,359
[45] Date of Patent: Dec. 26, 2000

[54] INDUCTION HEATING APPARATUS AND METHOD FOR PIPELINE WELDING OPERATIONS

[75] Inventor: John Duncan Cruickshank, Kincardinshire, United Kingdom

[73] Assignee: Coflexip Stena Offshore Ltd., United Kingdom

[21] Appl. No.: 09/424,683

[22] PCT Filed: Sep. 25, 1998

[86] PCT No.: PCT/GB98/02927

§ 371 Date: May 2, 2000

§ 102(e) Date: May 2, 2000

[87] PCT Pub. No.: WO99/16571

PCT Pub. Date: Apr. 8, 1999

[30] Foreign Application Priority Data

Sep. 27, 1997 [GB] United Kingdom .................... 9720519

[51] Int. Cl.⁷ .................................................. H05B 6/40
[52] U.S. Cl. .......................... 219/607; 219/611; 219/643; 219/670; 219/672
[58] Field of Search .................................... 219/607, 611, 219/617, 635, 643, 670, 672, 674, 676; 266/129

[56] References Cited

U.S. PATENT DOCUMENTS

| | | | |
|---|---|---|---|
| 4,371,768 | 2/1983 | Pozna ....................................... | 219/670 |
| 4,590,346 | 5/1986 | Sugihara et al. ......................... | 219/672 |
| 4,687,894 | 8/1987 | Koga et al. ............................... | 219/611 |
| 4,694,131 | 9/1987 | Ino et al. .................................. | 219/611 |

FOREIGN PATENT DOCUMENTS

| | | |
|---|---|---|
| 2 214 118 | 8/1989 | United Kingdom . |
| 2 295 345 | 5/1996 | United Kingdom . |

*Primary Examiner*—Philip H. Leung
*Attorney, Agent, or Firm*—Ostrolenk, Faber, Gerb & Soffen, LLP

[57] ABSTRACT

Induction heating apparatus for use in welding an end of a first length of pipe (26) to the exterior surface of a second length of pipe (28), consists of heating assemblies (20, 24) each comprising at least one electrical induction coil (32, 36) wound on an annular, laminated, magnetic core assembly (30, 34). The lowermost surfaces of said core assembly (30, 34) define a saddle shape adapted to be seated on the exterior surface of said second length of pipe (28). The arrangement of the coils (32, 36) and the core assemblies (30, 34) is such that substantially all of the magnetic flux generated when the apparatus is seated on the pipe (28) and the coil is energised is contained within the core assembly and within the wall of the pipe (28). Advantageously, the core assemblies (30, 34) have E-sections profiles, the ends of the limbs of the E-sections comprising the lowermost surfaces of the core assemblies and the coils being wound about the central limbs of the E-sections. The core assembly is formed from a plurality of part-annular segments, each segment having an individual induction coil associated therewith. The apparatus may comprise first and second heating assemblies, the first extending around the outer periphery of a circular weld zone defined on the exterior surface of said second length of pipe and the second extending around the inner periphery of the weld zone.

7 Claims, 5 Drawing Sheets

INDUCTION HEATING APPARATUS AND METHOD FOR PIPELINE WELDING OPERATIONS

The present invention relates to the use of electrical induction heating in pipeline welding operations, particularly, but not exclusively, welding operations carried out underwater, as in the offshore oil industry.

Most particularly, the invention is applicable to welding operations of the type where a length of pipe is welded to an existing pipeline which is already in service transporting fluids, so as to form a T-junction with the existing pipeline, without interrupting the flow of fluid in the existing pipeline. In such cases, the new length of pipeline is welded to the exterior surface of the existing pipeline, prior to forming an aperture in the existing pipeline to enable fluid communication between the new and existing pipes. Such operations are referred to in the art as "hot tap interventions". The invention is primarily intended for use in relation to subsea pipelines.

It is common in many types of welding operation to pre-heat the workpieces in the vicinity of the weld zone by means of electrical resistance heating, so as to facilitate the welding process. In the case where the operation is of the "hot tap" type, the fluid flowing through the existing pipeline conducts thermal energy away from the weld zone, so that conventional resistance heating elements are unable to supply sufficient energy to pre-heat the workpieces to the required temperature.

Accordingly, it is common practice to utilise electrical induction heating techniques in order to increase the pre-heating energy which can be supplied to the workpieces. Such techniques generally involve the use of annular induction coils, in which the conductors of the coils extend around the circumference of the new pipe on the surface of the existing pipe in multiple turns, as illustrated in FIG. 1 of the accompanying drawings. The coils are supplied with medium frequency alternating current. The electromagnetic flux 10 generated by the coil 12 is coupled into the workpieces 14 (the new pipe length) and 16 (the existing pipe) as shown, generating eddy currents in the workpieces and thereby increasing their temperature. An insulating mat 18 separates the coil 12 from the existing pipe 16.

The arrangement shown in FIG. 1 has significant disadvantages. The coils themselves are inefficient, as much of the input electrical energy is wasted in heating the coil itself. Also, as can be seen from the drawing, a substantial proportion of the flux is coupled to the pipes 14 and 16 well away from the weld zone, which extends around the end of the new pipe 14. Besides being wasteful of energy, this also means that the body of the new pipe 14, which has no fluid flowing through it, becomes overheated. The co-axial arrangement of the new pipe 14 and the coil 12 increases such overheating.

A solution to the overheating of the new pipe length (hereinafter referred to as the "pipe stub") is proposed in GB-A-2214118. This solution involves the use of "shielding" which surrounds the pipe stub and which is movable along the pipe stub towards and away from the weld zone. In all of the embodiments disclosed, the "shielding" comprises an arrangement for circulating cooling fluid around the exterior surface of the pipe stub. Accordingly, this solution requires relatively complex, additional apparatus, and does nothing to avoid the dissipation of thermal energy away from the weld zone.

It is an object of the present invention to provide improved methods and apparatus for use in pre-heating workpieces in welding operations such as those involved in hot tap intervention procedures.

In accordance with a first aspect of the invention, there is provided induction heating apparatus for use in welding an end of a first length of pipe to the exterior surface of a second length of pipe, consisting of at least one heating assembly comprising at least one electrical induction coil wound on an annular, laminated, magnetic core assembly, the lowermost surfaces of said core assembly defining a saddle shape so as to be capable of being seated on the exterior surface of said second length of pipe, the arrangement of the at least one coil and the core assembly being such that substantially all of the magnetic flux generated when the apparatus is seated on said second length of pipe and the coil is energised is contained within the core assembly and within the wall of said second length of pipe.

Preferably, said core assembly has an E-section profile, the ends of the limbs of the E-section comprising the lowermost surfaces of the assembly and said at least one coil being wound about the central limb of the E-section.

Most preferably, the core assembly is formed from a plurality of part-annular segments, each of said segments having an individual induction coil associated therewith.

In the particularly preferred embodiment of the invention, the apparatus comprises first and second heating assemblies as defined above, said first assembly being configured to extend around the outer periphery of a circular weld zone defined on the exterior surface of said second length of pipe and said second assembly being configured to extend around the inner periphery of said weld zone.

Other preferred features of the invention are set out below in the description of the preferred embodiment.

In accordance with a second aspect of the invention, there is provided a method of welding one end of a first length of tube to the exterior surface of a second length of tube, in which a weld zone extending around the union between the end of the first pipe and the surface of the second pipe is preheated by means of electrical induction heating means in accordance with the first aspect of the invention.

An embodiment of the invention will now be described, by way of example only, with reference to the accompanying drawings, in which.

Figure 1:
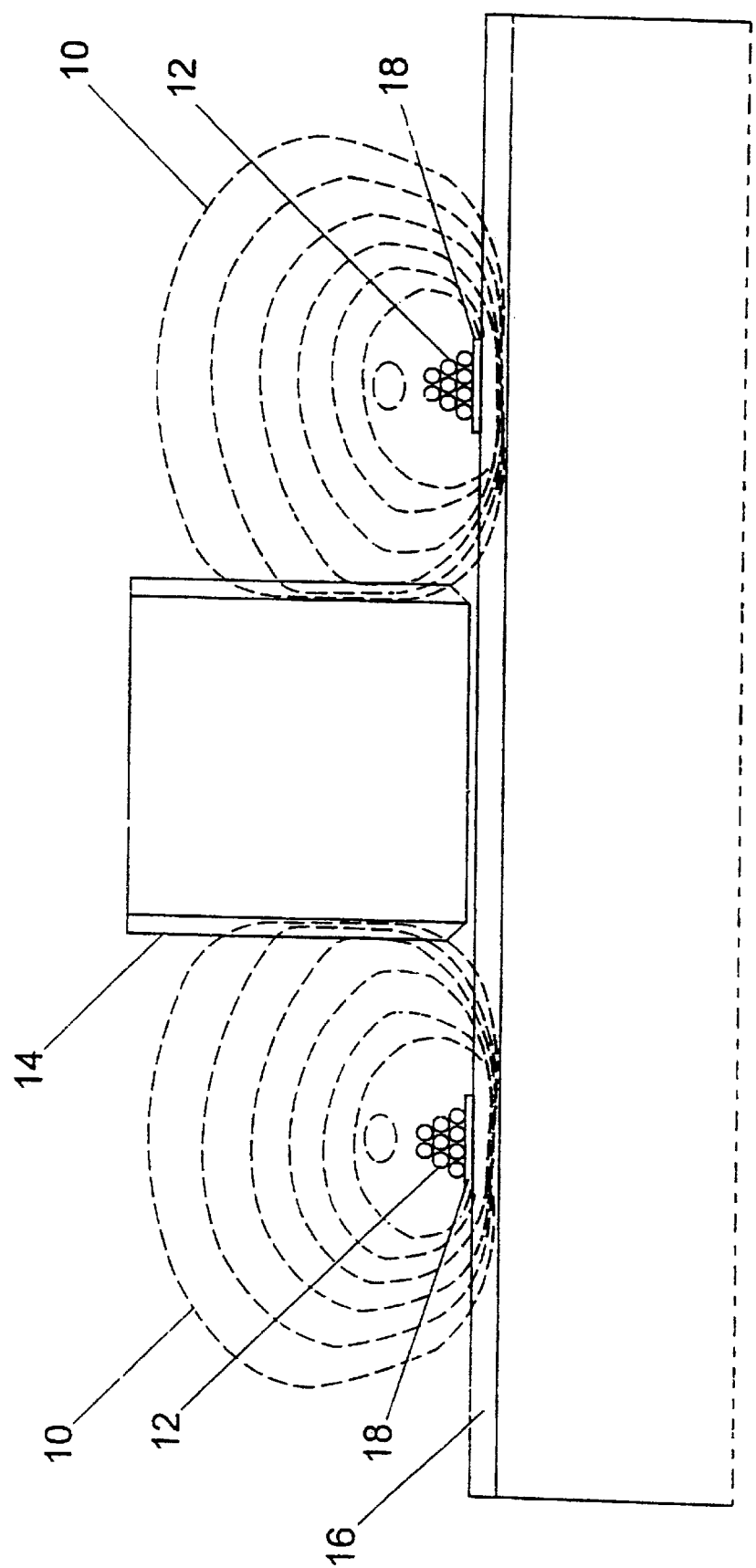
FIG. 1 is a schematic sectional view illustrating prior art induction heating arrangements for use in hot tap intervention procedures.
Figure 2:
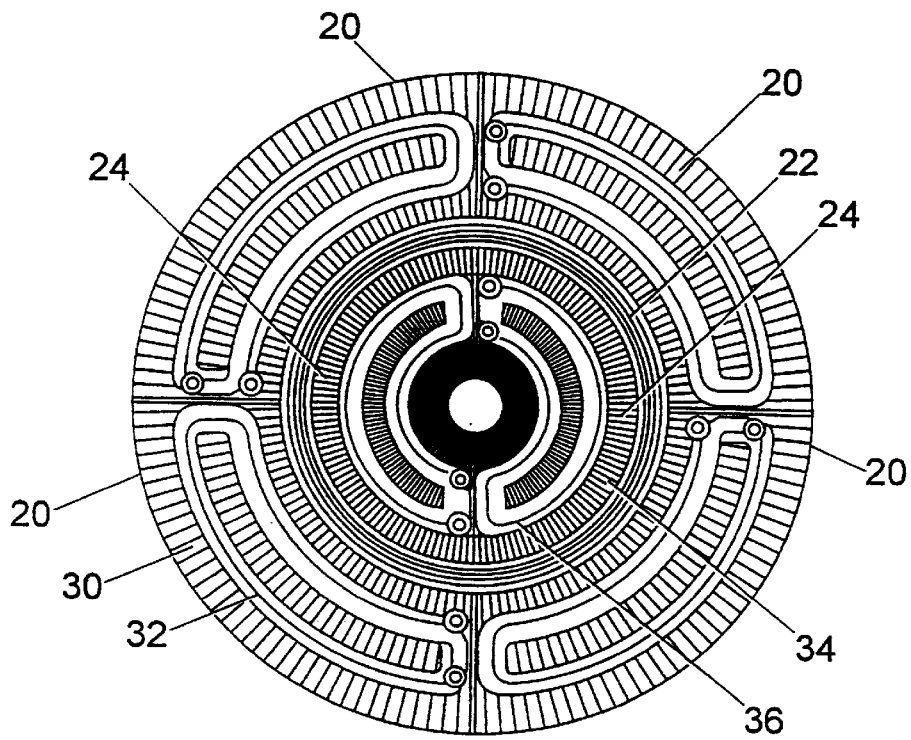
FIG. 2 is a cut-away plan view of an embodiment of an induction heating apparatus in accordance with the present invention.
Figure 3:
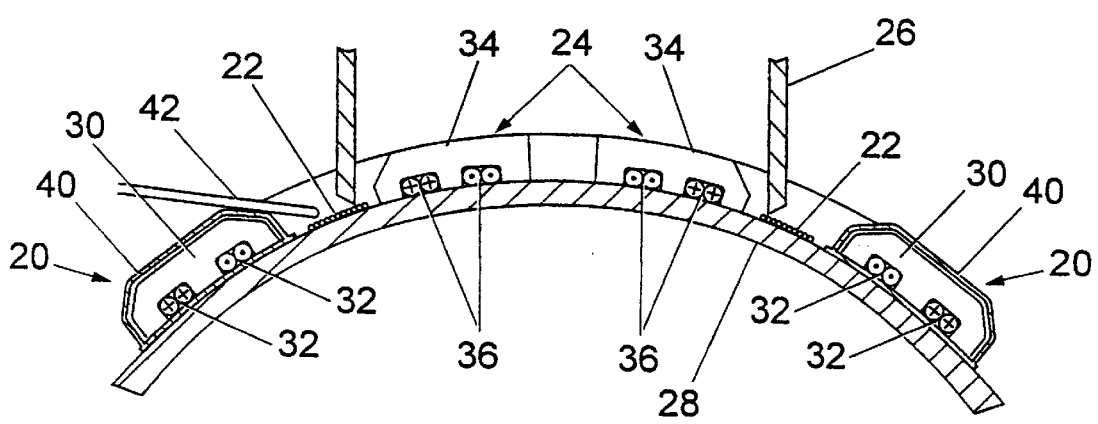
FIG. 3 is a sectional view on line A—A of FIG. 4, showing the heating apparatus located on a pipeline.
Figure 3A:
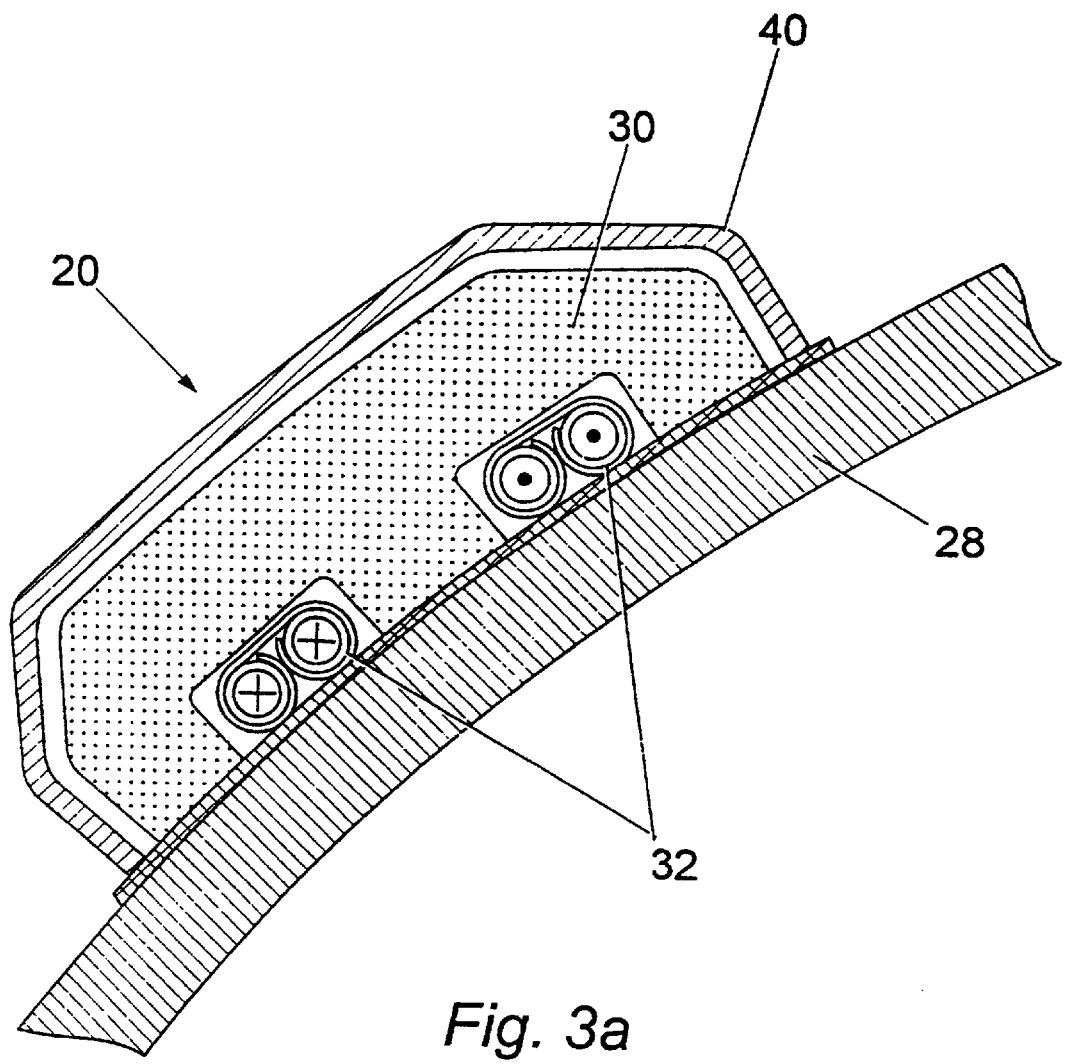
FIG. 3A is an enlarged view of a portion of FIG. 3.
Figure 4:
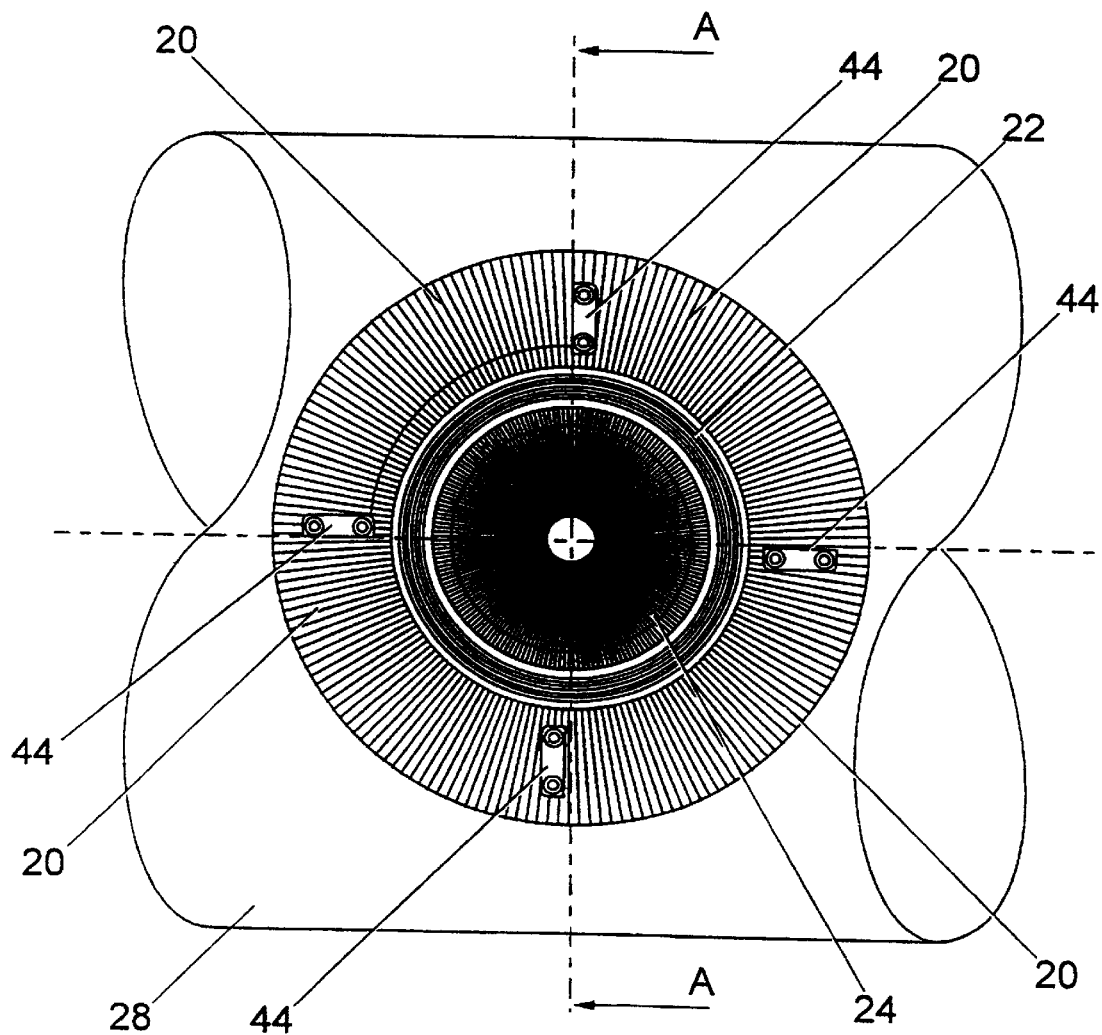
FIG. 4 is a plan view of the apparatus of FIG. 2, located on a pipeline.

Referring now to the drawings, FIGS. 2 to 4 show an induction heating apparatus comprising four outer segments 20, which are arranged around the outer periphery of a circular weld zone 22, and two inner segments 24 arranged around the inner periphery of the weld zone 22. That is, there is an annular space between the outer and inner segments, into which the pipe stub 26, which is to be welded to an existing pipeline 28, is inserted. The four outer segments 20 are substantially similar to one another, as are the two inner segments 24. It will be understood that the number of segments might be varied without departing from the scope of the present invention. Both the outer and inner segments might be replaced by single, annular units. However, as a matter of practicality, it is preferred that multiple segments are used.

It will also be understood that the weld zone 22, while being circular in plan, lies on the curved exterior surface of the existing pipeline 28, and that the segments 20 and 24 are shaped accordingly so as to follow the contours of the pipe surface. That is, the lowermost surfaces of the segments together have a saddle-shaped configuration.

Each of the outer segments comprises a magnetic core 30 of laminated steel (hereinafter referred to as a "laminated core") and an induction coil 32 comprising at least one turn of an electrical conductor wound upon the core 30. In view of the very high alternating current which is required to generate the required induction heating effect, each of the coils is likely to consist of no more than one or two turns. Each of the inner segments 24 similarly consists of a laminated core 34 and an induction coil 36 wound thereon.

The theory and practice of using laminated cores in connection with induction coils for a wide variety of purposes is well known and will not be described in detail herein. In the present case, the cores 30 and 34 and coils 32 and 36 are designed to suit the requirements of particular welding operations. The geometry and power capacity of the cores and coils will vary according to factors such as the pipe diameter, the fluid flow within the existing pipeline 28, the welding environment etc. The frequency of the alternating current supplied to the coils will similarly be selected to suit the requirements of the operation. The coils may be electrically connected in series or in parallel or in some combination of serial and parallel connections, to make best use of the available power supply and to ensure appropriate direction of current flow in adjacent coils.

The core segments 20 and 24 have a sectional profile which is selected to control the flux path through the existing pipe 28, in order to ensure that the heating of the pipe is localised to greatest effect and also to minimise stray flux in the surrounding environment. In this embodiment, the cores have an E-shaped sectional configuration, with the ends of the limbs of the E-section facing the workpiece and the coils being wound around the central limb. The outer portions of the core segments are also enclosed by protective covers, such as aluminium shrouds 40. The outer profiles of the cores are also configured to facilitate access by a welding torch 42 to the weld zone 22. This is particularly relevant to the inner periphery of the outer segments 20.

The cores 30, 34 and coils 32, 36 are isolated from the surface of the pipe 28 by means of insulating mats 44, suitably of glass fibre. The segments 20 and 24 are also provided with suitable means 44 to allow mechanical and electrical connections therebetween. These arrangements may also be adapted to permit circulation of cooling fluid to the coils and/or the cores. For example, the conductors of the coils may be hollow (e.g. being formed from copper tubing) to allow cooling fluid to flow through the interiors thereof.

Figure 5:
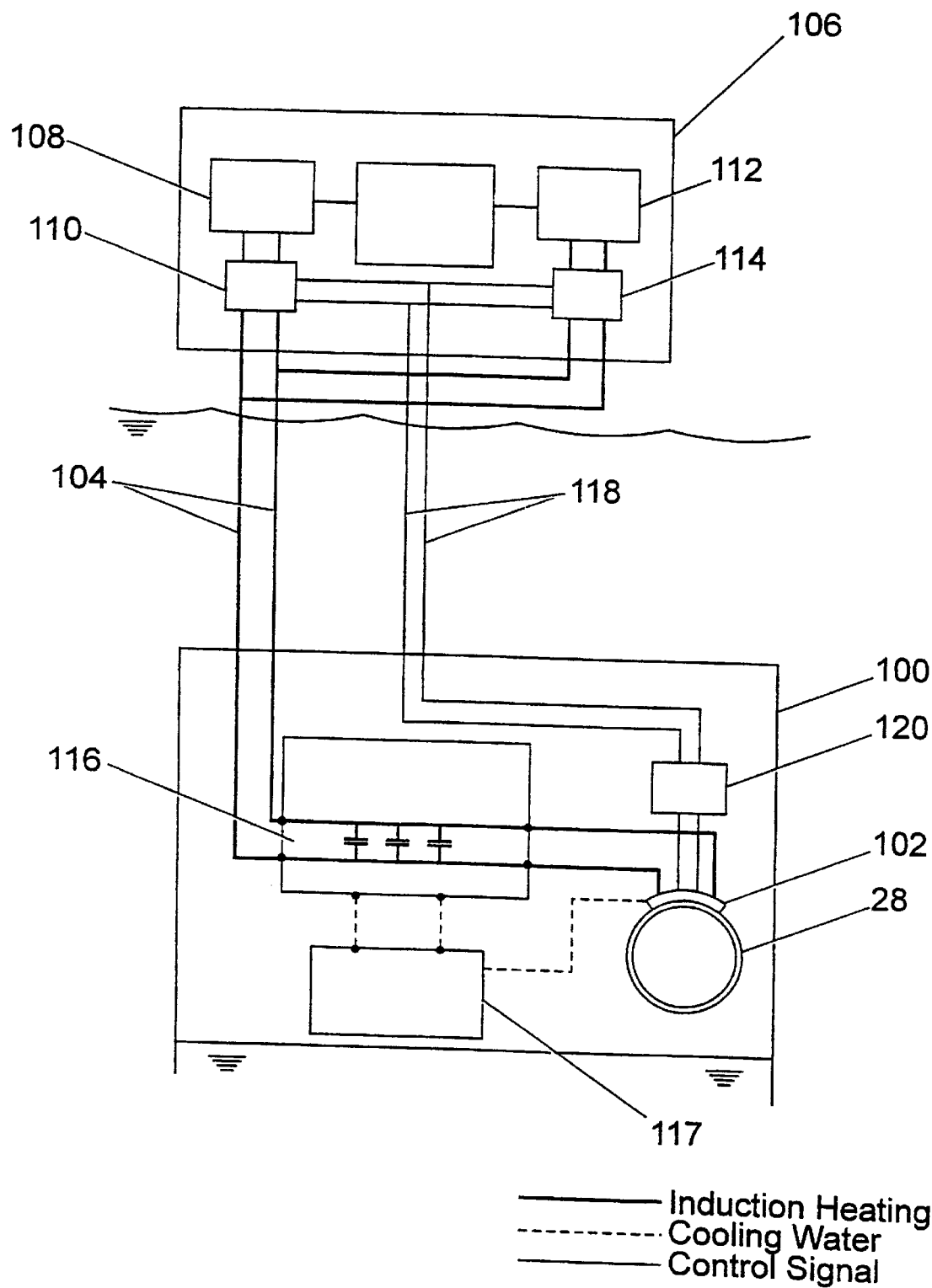
FIG. 5 is a system diagram illustrating the components of a system for subsea welding, incorporating the present invention, in accordance with a further aspect of the invention.

FIG. 5 illustrates a system for subsea welding, incorporating the apparatus of FIGS. 1 to 4. A subsea welding habitat 100, which is open at the bottom in the manner of a diving bell, encloses the existing pipe 28 to which the new pipe 26 is to be welded. Induction heating apparatus 102 in accordance with the first aspect of the invention is located on the surface of the pipe 28. A.C. power supply lines 104 extend from the heating apparatus 102, out of the habitat 100 to a support vessel or other facility 106 at the surface, where they are connected to a suitable power supply 108 and control means 110, and to back-up supply and control means 112, 114. A first cooling system is associated with the power supplies 108, 112.

The length of the power supply lines 104 is such that they can induce a phase difference between the current and voltage supplied to the heating apparatus. Accordingly, an array of power factor correction capacitors 116 is connected into the supply lines at the subsea end, as is well known in other types of electrical power systems. The values of the capacitors will depend upon the parameters of the power lines. The capacitors 116 are contained in a sealed housing having a one atmosphere internal pressure in order to protect them from pressure-damage (the interior of the habitat 100 being at "bottom pressure" determined by the depth of the water). A second cooling system 117 is also enclosed in the habitat, for supplying cooling fluid to the capacitors 116 and to the heating apparatus 102.

Control signal lines 118 are connected between the surface control means 110, 114 and a subsea control package 120. The heating apparatus 102 preferably incorporates sensors for monitoring the temperature at various locations including the weld zone, the cores of the heating coils and the pipe body below the coils.

The control system operates to control the power supply to the heating coils so as to maintain the respective temperatures of the weld area, pipes and cores within predetermined limits.

The present invention provides a number of benefits in comparison with prior art systems, as follow:

Improved induction coil efficiency

Minimal stray electromagnetic radiation

Minimal stray heating of the pipe stub

More efficient localisation of induction heating effects

Higher power input per unit area

Reduced diver/welder exposure to electromagnetic radiation (in line with new guidelines)

Minimal electromagnetic interference with the welding arc.

Improvements and modifications may be incorporated without departing from the scope of the invention.

I claim:

1. Induction heating apparatus for use in welding an end of a first length of pipe to the exterior surface of a second length of pipe, consisting of at least one heating assembly comprising at least one electrical induction coil wound on an annular, laminated, magnetic core assembly, the lowermost surfaces of said core assembly defining a saddle shape so as to be capable of being seated on the exterior surface of said second length of pipe, the arrangement of the at least one coil and the core assembly being such that substantially all of the magnetic flux generated when the apparatus is seated on said second length of pipe and the coil is energised is contained within the core assembly and within the wall of said second length of pipe and wherein said core assembly has an E-section profile, the ends of the limbs of the E-section comprising the lowermost surfaces of the core assembly and said at least one coil being wound about the central limb of the E-section.

2. Apparatus as claimed in claim 1, wherein the core assembly is formed from a plurality of part-annular segments, each of said segments having an individual induction coil associated therewith.

3. Apparatus as claimed in claim 1, wherein the apparatus comprises first and second heating assemblies as defined above, said first assembly being configured to extend around the outer periphery of a circular weld zone defined on the exterior surface of said second length of pipe and said second assembly being configured to extend around the inner periphery of said weld zone.

4. Apparatus as claimed in claim 1, further including thermal insulation means whereby the lowermost surfaces of said core assembly are thermally isolated from said second pipe.

5. Apparatus as claimed in claim 1, further including cooling means whereby cooling fluid is circulated around said heating assembly.

6. Apparatus as claimed in claim 5, wherein said at least one electrical induction coil comprises a conductor having a hollow interior, and said cooling means includes means for circulating cooling fluid through the interior of said conductor.

7. A method of welding one end of a first length of tube to the exterior surface of a second length of tube, in which a weld zone extending around the union between the end of the first pipe and the surface of the second pipe is preheated by means of electrical induction heating means in accordance with claim 1.

* * * * *